United States Patent [19]

Minami

[11] Patent Number: 4,985,210
[45] Date of Patent: Jan. 15, 1991

[54] EXHAUST GAS PURIFYING APPARATUS FOR AUTOMOBILE

[75] Inventor: Takashi Minami, Toyota, Japan

[73] Assignee: 501 Toyota Jidosha Kabushiki Kaisha, Toyota, Japan

[21] Appl. No.: 400,797

[22] Filed: Aug. 30, 1989

[30] Foreign Application Priority Data

Sep. 9, 1988 [JP] Japan .................. 63-226070

[51] Int. Cl.$^5$ .......................................... B01D 50/00
[52] U.S. Cl. ....................... 422/169; 422/171; 422/172; 55/35; 55/75; 55/389; 423/213.5; 423/213.7; 423/328
[58] Field of Search ............... 422/169, 170, 171, 172; 423/212, 213.2, 213.5, 213.7, 326, 328; 55/35, 75, 389

[56] References Cited

U.S. PATENT DOCUMENTS

| | | | |
|---|---|---|---|
| 3,273,971 | 9/1966 | Baddorf et al. | 422/171 |
| 3,297,400 | 1/1967 | Eastwood | 422/171 |
| 3,657,892 | 4/1972 | Perga et al. | 422/171 |
| 3,791,143 | 2/1974 | Keith et al. | 422/171 |
| 3,813,226 | 5/1974 | Heitland et al. | 422/171 |
| 4,402,714 | 9/1983 | Fethke et al. | 55/35 |
| 4,425,143 | 1/1984 | Nishizawa et al. | 422/169 |
| 4,571,329 | 2/1986 | Kato et al. | 422/171 |
| 4,743,276 | 5/1988 | Nishida et al. | 55/75 |
| 4,762,537 | 8/1988 | Fleming et al. | 55/389 |

FOREIGN PATENT DOCUMENTS 57-159908 10/1982 Japan .
62-5820 1/1987 Japan .

*Primary Examiner*—Robert J. Warden
*Assistant Examiner*—Lynn M. Kummert
*Attorney, Agent, or Firm*—Finnegan, Henderson, Farabow, Garrett & Dunner

[57] ABSTRACT

An exhaust gas purifying apparatus employing a 3-way catalyst has either a Y-type zeolite or a mordenite as an adsorbent for adsorbing a harmful component in exhaust gas which is disposed at the upstream side of the catalytic converter so that, when the exhaust gas temeprature is not higher than a specific temperature, a harmful component is adsorbed by means of the adsorbent, whereas, when the exhaust gas temperature exceeds the specific temperature, the harmful component desorbed from the adsorbent is introduced into the catalytic converter. Further, an activated carbon trapper and a by-pass are provided in parallel at the upstream side of the adsorbent so that the flow paths of exhaust gas are selectively switched from one to the other in accordance with the level of the exhaust gas temperature.

3 Claims, 4 Drawing Sheets

EXHAUST GAS PURIFYING APPARATUS FOR AUTOMOBILE

BACKGROUND OF THE INVENTION

1. Field of the Invention

The present invention relates to an exhaust gas purifying apparatus for an automobile.

2. Description of the Prior Art

Pellet-shaped or monolithic catalysts are generally used to purify exhaust gas from automobiles. Among harmful components (HC, CO and $NO_x$) in exhaust gas, purification of HC by means of a catalyst is strongly dependent on the temperature of exhaust gas and needs a high temperature, generally 300° C. or higher, even when a noble metal catalyst is used. Accordingly, HC is difficult to purify by means of a catalyst when the exhaust gas temperature is relatively low, for example, immediately after the engine has been started. Moreover, since a large amount of HC is emitted immediately after starting of the engine, the ratio of HC emitted when the exhaust gas temperature is relatively low (hereinafter referred to as "cold HC") to the whole emission is relatively high. Therefore, it has heretofore been a subject to control the emission of cold HC. Although a method wherein the engine is controlled to reduce the amount of HC emitted from the engine has been adopted, this method is unfavorable because it causes lowering in the intrinsic performance of the engine.

To solve the above-described problem, Japanese Utility Model Laid-Open No. 62-5820 (1987) and Japanese Patent Laid-Open No. 57-159908 (1982) disclose one type of exhaust gas purifying apparatus which is designed to adsorb HC in exhaust gas when the exhaust gas temperature is relatively low. Of these two prior arts, Japanese Utility Model No. 62-5820 (1987) uses an adsorbent and a catalyst in such a manner that, when the exhaust gas temperature is relatively low, the adsorbent adsorbs HC, whereas, when the temperature is relatively high, the catalyst purifies both HC desorbed from the adsorbent and HC emitted from the engine.

The above-described conventional exhaust gas purifying apparatus suffers, however, from the following problems. Namely, examples of materials which are proposed in the prior art as being usable adsorbents are $\gamma$-alumina, porous glass, activated carbon, silica gel, etc. and it has been impossible to obtain satisfactory adsorption efficiency with these materials. In particular, the adsorption efficiency of these adsorbents lowers considerably when the exhaust gas temperature is high and, therefore, if the exhaust gas temperature is somewhere between a temperature at which the adsorption efficiency starts to lower and a temperature at which purification by means of the catalyst is available, HC will be undesirably emitted without being adsorbed by the adsorbent nor purified by means of the catalyst. For this reason, it has heretofore been impossible to obtain the desired HC purifying efficiency.

Accordingly, it is an object of the present invention to provide an exhaust gas purifying apparatus of such a type that, when the exhaust gas temperature is relatively low, the adsorbent adsorbs HC, whereas, when the temperature is relatively high, the catalyst purifies both HC desorbed from the adsorbent and HC emitted from the engine, wherein the HC adsorption efficiency of the adsorbent in a high-temperature region is improved by a large margin so that the adsorbent is capable of effectively adsorbing HC up to a temperature at which purification by means of the catalyst is available, thereby enabling excellent HC purifying efficiency to be obtained without lowering the engine performance of the automobile.

As a result of exhaustive study of adsorbents having high HC adsorption efficiency, the present inventor has found that zeolites exhibit high HC adsorption efficiency up to relatively high temperature, and further confirmed that among zeolites mordenite and Y-type zeolite have particularly excellent HC adsorption efficiency and are long lasting.

SUMMARY OF THE INVENTION

The feature of the exhaust gas purifying apparatus for an automobile according to the present invention resides in that a catalyst for purifying a harmful component in exhaust gas is disposed in the exhaust system and either a Y-type zeolite or a mordenite is disposed as being an adsorbent at the upstream side of the catalyst.

There have been discovered or prepared several tens of different types of zeolites including natural and synthetic ones and these zeolites differ remarkably from each other in properties. It has become clear that mordenite and Y-type zeolite are most suitable in the present invention since zeolites that are employed in the present invention are required to exhibit satisfactorily high HC adsorption efficiency in a temperature range of from ordinary temperature to a relatively high temperature and maintain the HC adsorption efficiency even after it has been used for a long time at high temperature, that is, have satisfactory durability.

In the exhaust gas purifying apparatus, it is possible to employ a purifying catalyst which has heretofore been used to purify exhaust gas, for example, an oxidizing catalyst or a 3-way catalyst. It is preferable to use a 3-way catalyst.

The purifying catalyst and adsorbent that are used in the present invention may be in any desired form, for example, a monolithic structure, pellets, a foam, a mesh, etc.

It is preferable to further dispose activated carbon at the upstream side of the adsorbent.

It is more preferable to dispose activated carbon at the upstream side of the adsorbent and provide a by-pass which provides communication between the exhaust pipes at the upstream and downstream sides of the activated carbon so that, when the exhaust gas temperature is not higher than a predetermined temperature, exhaust gas is introduced into the catalytic converter through the activated carbon and the adsorbent, whereas, when the exhaust gas temperature exceeds the predetermined temperature, the exhaust gas passes through the by-pass to enter the adsorbent directly and is then introduced into the catalytic converter. This arrangement enables prevention of the activated carbon from being exposed to high temperature and eventually destroyed and also makes it possible to prevent generation of a pressure loss in the exhaust system. In this case, said predetermined temperature is preferably set within the range of from 100° to 300° C. To reduce the pressure loss, a by-pass may be provided also at the position of the adsorbent so that, when the exhaust gas temperature is 300° C. or higher, the exhaust gas is introduced directly into the catalytic converter.

According to the exhaust gas purifying apparatus of the present invention, the adsorbent exhibits excellent adsorption power over a wide temperature range of from ordinary temperature to relatively high temperature and, therefore, when the exhaust gas temperature is lower than about 300° C., HC in the exhaust gas is effectively adsorbed by the adsorbent, whereas, when the exhaust gas temperature is about 300° C. or higher, both HC desorbed from the adsorbent and HC emitted from the engine are purified by means of the catalyst.

DETAILED DESCRIPTION OF THE INVENTION

The present invention will be described below in more detail by way of Examples.

EXAMPLE 1

Figure 1:
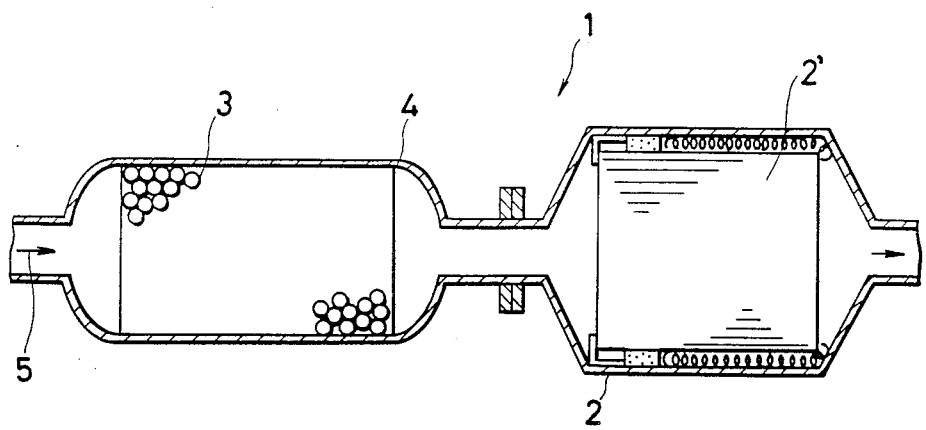
FIG. 1 is a sectional view of an exhaust gas purifying apparatus according to one embodiment of the present invention.

FIG. 1 shows an exhaust gas purifying apparatus according to one embodiment of the present invention.

The exhaust gas purifying apparatus 1 has a monolithic catalytic converter 2 provided in the exhaust system and a trapper 4 filled with a pellet-shaped adsorbent 3 which is provided at the upstream side of the catalytic converter 2.

In the exhaust gas purifying apparatus 1, when the temperature of exhaust gas 5 at inlet of trapper is lower than about 300° C., HC is adsorbed by the adsorbent 3 in the trapper 4, whereas, when the exhaust gas temperature at inlet of trapper is about 300° C. or higher, HC is desorbed from the adsorbent 3 and flows into the catalytic converter 2 where it is purified by means of a catalyst 2'.

The catalyst 2' that is filled into the catalytic converter 2 is not particularly limited. In this example, however, a catalyst prepared by the following method was employed.

First, 100 parts of alumina, 140 parts of alumina sol (10wt %) and 14 parts of a commercially available aqueous aluminum nitrate were subjected to ball milling together with water and nitric acid to prepare a wash coat slurry, and 1.3 l of cordierite monolithic carrier including about 400 flow paths per sectional area of 1 in$^2$ was dipped in the wash coat slurry. After the monolithic carrier had been pulled up from the slurry, an excess liquid was blown off from the cells in the carrier and then the monolithic carrier was dried to remove free water. Thereafter, burning was carried out at 500° C. for 1 hour to obtain a monolithic carrier coated with alumina.

Next, the carrier thus obtained was dipped in a nitric acid aqueous solution of dinitrodiammineplatinum. After drying, the carrier was burned at 200° C. for 1 hour to obtain a carrier coated with 1.0 g/l of platinum. Subsequently, the resulting platinum catalyst was dipped in an aqueous rhodium chloride solution. After drying, the catalyst was burned at 200° C. for 1 hour to prepare a platinum-rhodium catalyst 2' having 0.1 g/l of rhodium coated on the carrier.

The method of producing the adsorbent 3 will next be explained.

An H$^+$ ion-substituted mordenite and a clay mineral were mixed, formed and dried to obtain pellets having a diameter of 3 mm and a length of 3 mm. One liter of pellets thus obtained was filled into the trapper 4.

EXAMPLE 2

An exhaust gas purifying apparatus was produced in the same way as in Example 1 except that a Y-type zeolite (Cu$^+$ ion-substituted) was employed in place of the mordenite.

In order to clarify the features and advantages of the above-described mordenite and Y-type zeolite, the following tests were conducted.

HC adsorption efficiency test

Figure 4:
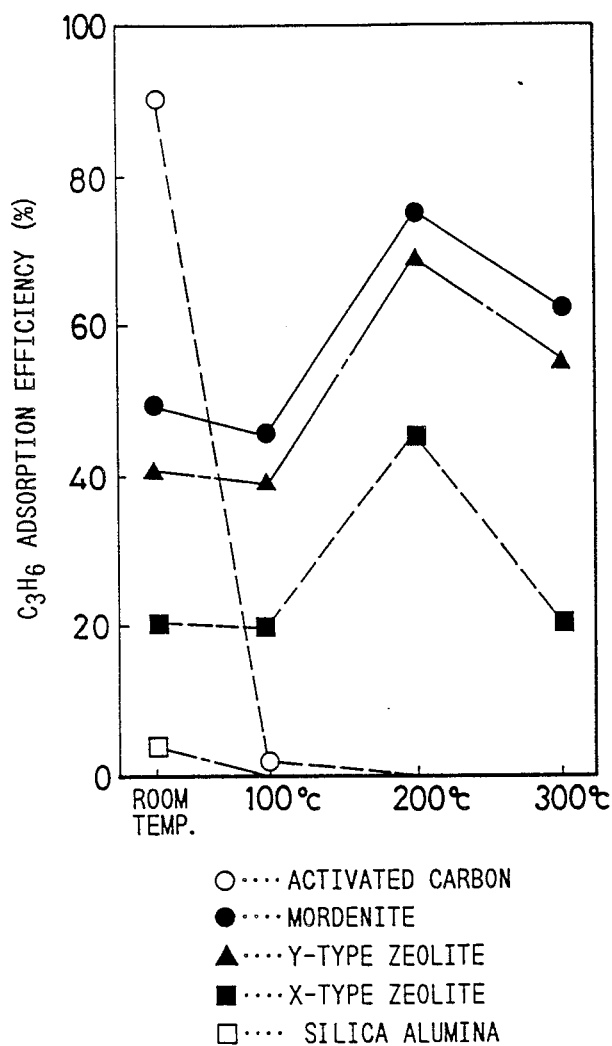
FIG. 4 is a graph showing the respective $C_3H_6$ adsorption efficiencies of the adsorbents used in the present invention and those in the prior art.

To make a comparison as to the HC adsorption efficiency between mordenite, Y-type zeolite, X-type zeolite, alumina silica and activated carbon, a gas containing 1,000 ppm of $C_3H_6$ and the balance of $N_2$ was passed through each of the adsorbents to obtain the rate of adsorption. The results are shown in the graph of FIG. 4. As will be clear from the graph, the $C_3H_6$ adsorption efficiencies of mordenite and Y-type zeolite are higher than those of alumina silica and activated carbon and are considerably excellent particularly at the high-temperature side.

$C_3H_6$ adsorption efficiency test after endurance

Figure 5:
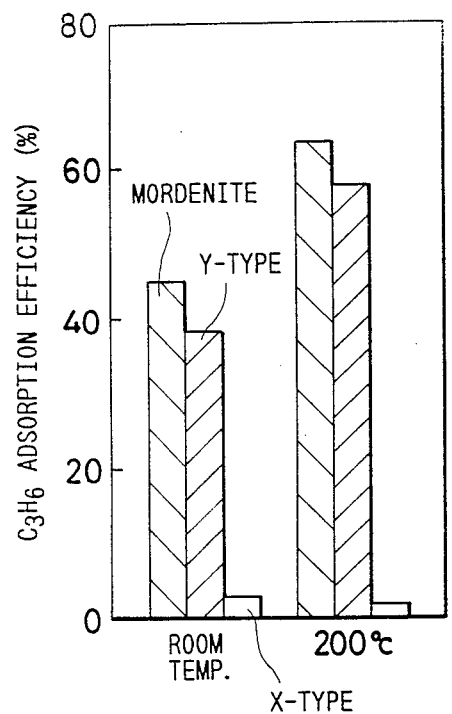
FIG. 5 is a graph showing the respective $C_3H_6$ adsorption efficiencies after endurance of the adsorbents used in the present invention and those in the prior art.

The $C_3H_6$ adsorption efficiencies of mordenite, Y-type zeolite and X-type zeolite after endurance at 800° C. for 5 hours were measured. The results are shown in the graph of FIG. 5. As will be clear from the graph, the $C_3H_6$ adsorption efficiencies after endurance of mordenite and Y-type zeolite are considerably higher than that of X-type zeolite.

It will be understood from these tests that mordenite and Y-type zeolite are excellent materials as being adsorbents for use in exhaust gas purifying apparatuses for automobiles.

EXAMPLE 3

Figure 2:
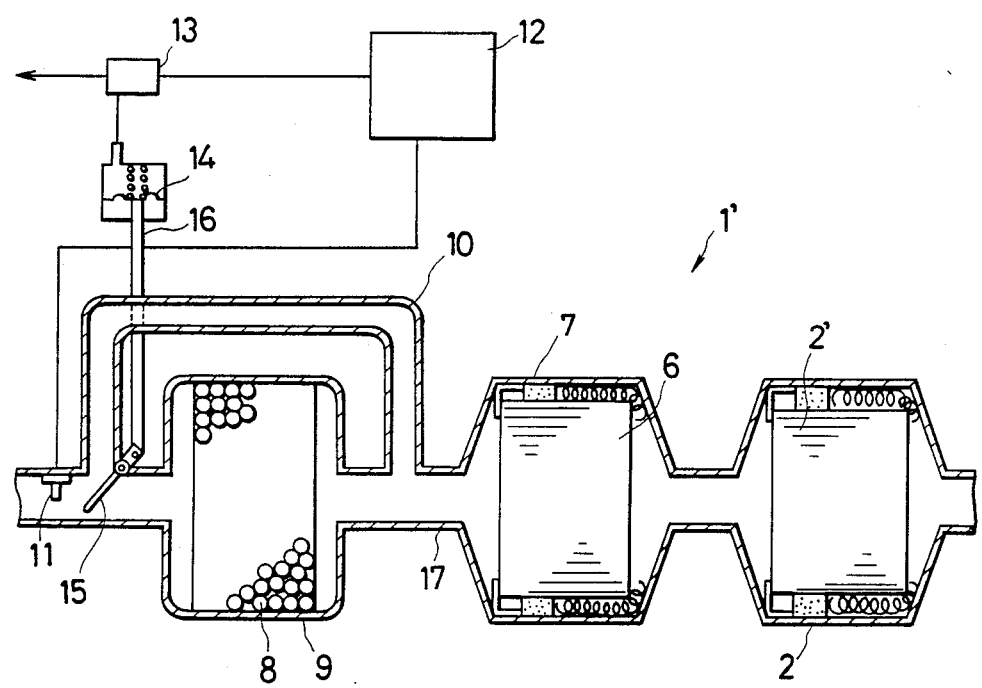
FIG. 2 is a sectional view of an exhaust gas purifying apparatus according to another embodiment of the present invention.

FIG. 2 is a sectional view of an exhaust gas purifying apparatus 1' according to another embodiment of the present invention.

The exhaust gas purifying apparatus 1' has a monolithic catalytic converter 2 provided in the exhaust system, a trapper 7 accommodating a monolithic adsorbent 6 coated with mordenite which is provided at the upstream side of the catalytic converter 2, and a trapper 9 filled with activated carbon 8 which is provided at the upstream side of the trapper 7.

The catalytic converter 2 and the trappers 7 and 9 are communicated with each other through an exhaust pipe 17, and a by-pass 10 is provided in parallel to the exhaust pipe 17, the by-pass 10 opening at both ends into the exhaust pipe 17 and outlet, respectively, of the trapper 9. A temperature sensor 11 is attached inside the exhaust pipe 17 near the inlet of the trapper 9. A switching valve 15 is provided at a position where the inlet of the trapper 9 and the inlet of the by-pass 10 meet together, the valve 15 being connected to a diaphragm 14 through a connecting rod 16.

The catalyst 2' filled in the catalytic converter 2 of the exhaust gas purifying apparatus 1' in this Example is the same as that in Example 1. The monolithic adsorbent 6 is produced in such a manner that a cordierite monolithic carrier is dipped in a slurry containing mordenite to obtain a monolithic adsorbent coated with 120 g/l of mordenite and the resulting adsorbent is installed in the trapper 7.

In the exhaust gas purifying apparatus of this Example, when the exhaust gas temperature is lower than 150° C., the solenoid-operated valve 13 is closed and the connecting rod 16 is pushed out, so that the switching valve 15 closes the inlet of the by-pass 10 and allows the exhaust gas to flow into the trapper 9. When the temperature sensor 11 detects 150° C., the controller 12, receiving the signal from the temperature sensor 11, opens the solenoid operated valve 13. In consequence, the intake negative pressure acts on the diaphragm 14 so as to pull up the connecting rod 16, thus causing the switching valve 15 to rotate so as to close the inlet of the trapper 9. Accordingly, when the exhaust gas temperature is lower than 150° C., the exhaust gas is introduced into the catalytic converter 2 through the trapper 9 filled with the activated carbon 8 and the trapper 7 filled with the monolithic adsorbent 6, whereas, when the exhaust gas temperature is 150° C. or higher, the exhaust gas passes through the by-pass 10 to enter the trapper 7 directly and is then introduced into the catalytic converter 2. It is therefore possible to adsorb HC by the activated carbon 8 or the adsorbent 6 and purify it by means of the catalyst 2' without a fear of the activated carbon 8 being exposed to high temperature and eventually destroyed and with the pressure loss in the exhaust system being held at a low level. Since the HC adsorption efficiency at low temperature of activated carbon is higher than that of mordenite, the HC purifying efficiency of the apparatus in this Example is superior to that of the apparatus including only mordenite and a catalytic converter.

COMPARATIVE EXAMPLE 1

An exhaust gas purifying apparatus was produced in the same way as in Example 1 except that an X-type zeolite ($Na^+$ ion-substituted) was used as being an adsorbent in place of the mordenite.

COMPARATIVE EXAMPLE 2

An exhaust gas purifying apparatus was produced in the same way as in Example 1 except that alumina was used as being an adsorbent in place of the mordenite.

EXPERIMENTAL EXAMPLE 1

Figure 3:
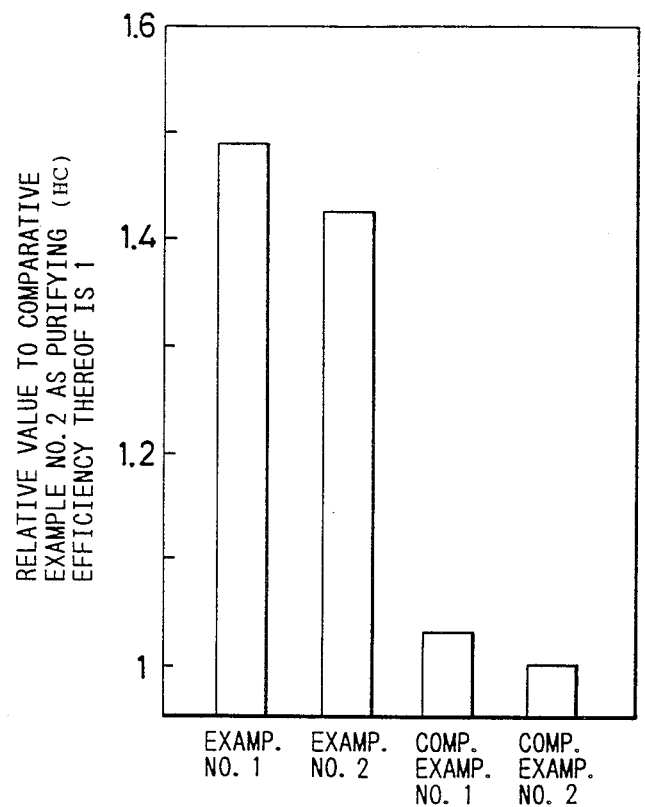
FIG. 3 is a graph showing the respective HC purifying efficiencies of the exhaust gas purifying apparatuses according to the present invention and those according to Comparative Examples.

In order to make a comparison as to the HC purifying efficiency between the exhaust gas purifying apparatuses of Examples 1, 2 and Comparative Examples 1, 2, each apparatus was first subjected to endurance on an engine bench for 100 hours under the conditions of 3,000 rpm and an inlet gas temperature of 800° C. and then subjected to cold start evaluation (start→idling→acceleration→running at 60 km/hour) on an engine bench. The results are shown in the graph of FIG. 3. The HC purifying efficiencies shown in the graph are expressed in values relative to the rate of purification of HC in Comparative Example 2, which is taken as 1. As will be clear from the graph, the HC purifying efficiencies of the apparatuses of Examples 1 and 2 that employ a mordenite and a Y-type zeolite, respectively, as being adsorbents are markedly superior to those of the apparatuses of Comparative Examples 1 and 2 that employ an X-type zeolite and alumina, respectively, as being adsorbents.

EXPERIMENTAL EXAMPLE 2

The HC purifying efficiency of the exhaust gas purifying apparatus in Example 3 was compared with that of a converter accommodating a monolithic catalyst comprising a 1.7 l of monolithic carrier coated with Pt/Rh=1.5/0.15 g/l.

LA#4 cold mode evaluation revealed that the HC emission in Example 3 lowered to 43% of that in Comparative Example 2. Thus, it will be understood that the purifying efficiency of the apparatus in Example 3 is considerably excellent.

In the exhaust gas purifying apparatus according to the present invention, a Y-type zeolite or a mordenite is disposed as being an adsorbent at the upstream side of a catalyst, so that, when the exhaust gas temperature is low, HC is effectively adsorbed, whereas, when the exhaust gas temperature is high, HC is purified by means of the catalyst. Since the adsorption efficiencies of Y-type zeolite and mordenite are exceedingly higher than those of the conventional adsorbents, the purifying efficiency of the apparatus is remarkably improved and the engine performance is also improved since there is no need for a measure to reduce cold HC at the engine side which has heretofore been taken.

What is claimed is:

1. An exhaust purifying apparatus designed to purify exhaust gas by means of catalyst, comprising:
   a catalytic converter accommodating the catalyst;
   an adsorbent trapper connected to the upstream side of said catalytic converter, said trapper accommodating either a Y-type zeolite or a mordenite adsorbent for adsorbing a harmful component in exhaust gas;
   an activated carbon trapper accommodating activated carbon and connected to the upstream side of said adsorbent trapper;
   a by-pass provided between a first upstream exhaust pipe connected to the upstream side of said activated carbon trapper and a second exhaust pipe connecting the down-stream side of said activated carbon trapper and the upstream side of said adsorbent trapper; and
   a switching valve provided at the intersection of said by-pass with said first upstream exhaust pipe, said switching valve being opened and closed in response to the operation of a solenoid-operated valve which is opened and closed in response to a signal from an exhaust gas temperature sensor when the temperature of said exhaust gas is within the range of from 100° C. to 300° C.

2. The exhaust gas purifying apparatus according to claim 1, wherein said switching valve closes the inlet of said by-pass when the temperature of said exhaust gas is below a predetermined temperature within the range of from 100° C. to 300° C. and closes the inlet of said activated carbon trapper when the temperature of said exhaust gas is at said predetermined temperature or higher.

3. The exhaust gas purifying apparatus according to claim 2, wherein said switching valve is connected to a connecting rod moveable in response to the operation of said solenoid-operated valve.

* * * * *

UNITED STATES PATENT AND TRADEMARK OFFICE
CERTIFICATE OF CORRECTION

PATENT NO. : 4,985,210

DATED : January 15, 1991

INVENTOR(S) : Takashi Minami

It is certified that error appears in the above-identified patent and that said Letters Patent is hereby corrected as shown below:

On the Title page, in the Abstract, lines 5 and 6, change "temperature". to --temperature--.

Claim 1, column 6, lines 36 and 37, delete [adsorbent].

Signed and Sealed this

Twenty-ninth Day of December, 1992

Attest:

DOUGLAS B. COMER

Attesting Officer

Acting Commissioner of Patents and Trademarks